Figure 1:
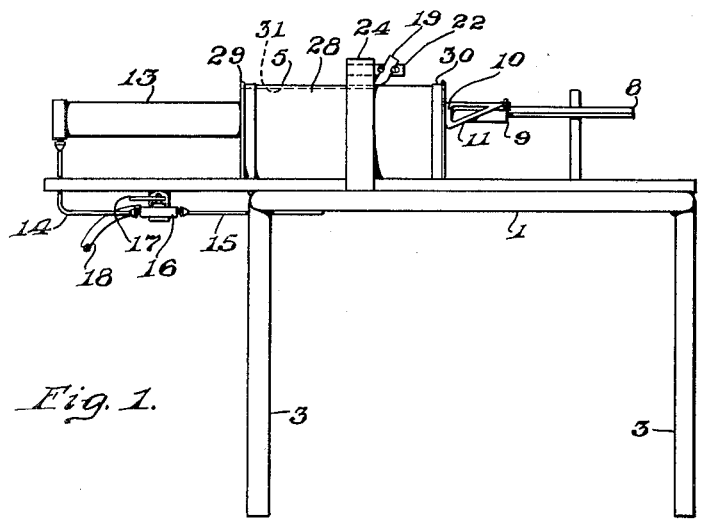

May 9, 1950  J. B. ORRELL  2,506,969
DEVICE FOR OPENING CONTAINERS OF
SOLID FROZEN SWEET CREAM FATS
Filed June 4, 1947

INVENTOR,
Joseph B. Orrell,
BY J. Stuart Freeman,
Attorney.

Patented May 9, 1950

2,506,969

UNITED STATES PATENT OFFICE 2,506,969

DEVICE FOR OPENING CONTAINERS OF SOLID FROZEN SWEET CREAM FATS

Joseph B. Orrell, Philadelphia, Pa., assignor to Abbotts Dairies, Incorporated, Philadelphia, Pa., a corporation of Maryland Application June 4, 1947, Serial No. 752,509

3 Claims. (Cl. 30—2)

The object of the invention is to provide improvements in package opening devices, and especially in a type that is adapted to quickly, efficiently and sanitarily open the relatively large cylindrical containers in which concentrated sweet cream fat is stored and shipped in solidly frozen form, and which containers are at present made of paper board, but instead may be made of any other suitable material.

The concentrated sweet cream fat is separated from the liquid phase of whole milk to a degree of concentration that runs from the neighborhood of about 40% with some manufacturers to as high as 80% or slightly thereover. It is placed while still in viscous form in relatively inexpansible containers and frozen solid to a temperature that with some manufacturers runs as low as 20° F., or even lower, and at which temperature it is literally rock-hard and therefore has to be either thawed, or preferably machine-cut directly into an ice-cream or other mix, in order to prevent its even slightly tempering before reaching the mix, and thereby contributing to off-tastes and spoilage due to its entrapment and carrying of spores, bacteria, etc. into the mix from which the final ice cream or other product is made.

Instead of the old forms of heavy metallic cans that once were in common use for the storage of cream, milk, ice cream and other dairy products, the practise today is to store and ship such products (when in the frozen state) in stiff paper board containers, that are destroyed when opened and emptied, though instead of paper board it is realized that in time sheet plastic and possibly other materials may be used. The paper board containers of today's practise consist of a cylindrical body portion, to which is secured in any convenient manner a bottom disc-shaped wall or closure of the same material, while upon the opposite end or top is placed a shallow paper board cover, all of which parts become unitarily united with one another and with the packaged contents by and upon hard freezing of the latter.

Another and more specific object, therefore, is to provide a device or machine, which broadly comprises a support for any suitably shaped container of frozen dairy or other products, a knife, preferably fixedly positioned, and means to cause relative movement between said container and said knife, whereby preferably one side of the body portion of the container is severed from end to end and therefore from cover to bottom disc, or vice versa, so that the top and bottom elements readily fall off or may be easily separated from said body portion and its contents, after which one severed edge of said body portion may be lifted and the entire container body unrolled from its solid content for subsequent cutting, grinding or other treatment of the latter in any way desired.

A further object is to provide a device of this kind, which in its preferred form comprises a suitable support for a cylindrical container lying in horizontal position, said support also comprising a guide for said container, an adjustable, normally fixedly positioned knife, and means to propel said container and its contents from its initial position past and in severing engagement with said knife, so that one side of the flange of the cover is first severed, followed by the side of the body portion, until said knife passes the bottom element, after which the opened container and its contents can be readily lifted from said support and the support returned to its initial position, ready to receive another such container.

Figure 2:
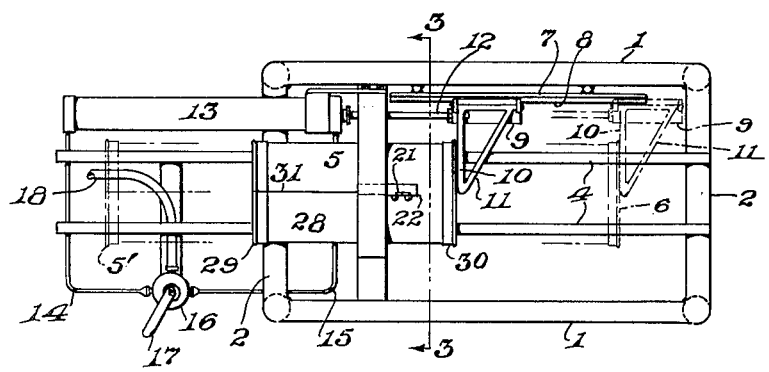
Figure 3:
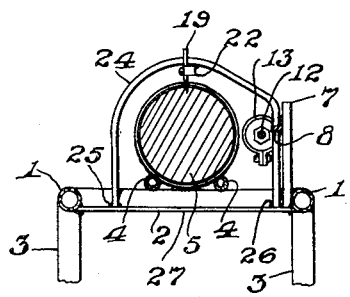
Figure 4:
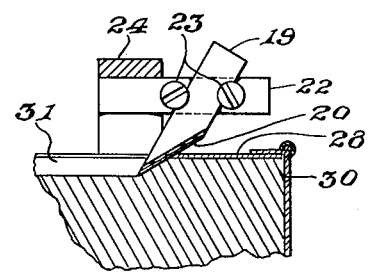

With the objects thus briefly stated, the invention comprises further details of construction and operation, which are hereinafter fully brought out in the following description, when read in conjunction with the accompanying drawings, in which Fig. 1 is a front elevation of a device comprising one embodiment of the invention; Fig. 2 is a plan view of the same; Fig. 3 is a section on the line 3—3 of Fig. 2; and Fig. 4 is an enlarged fragmentary section taken at right angles to the line 3—3 of Fig. 2 and showing the relationship of the knife with the container and its contents, as said knife approaches the lower or bottom of the container.

Referring to the drawings, any suitable stand may be used to support the active and essential elements of the device, but for purposes of illustration one form of support is shown as comprising a rectangular frame composed of side and end members 1 and 2, supported from the floor or other base by means of any desired number of legs 3, said frame being preferably constructed of tubing of any desired size and thickness.

Mounted upon and extending between the ends 2 are a pair of spaced, parallel tubes, rails or bars 4 upon which a cylindrical or other shape of container 5 may be made to rest, as indicated by the dot-and-dash lines 6, in an initial extreme outer position. A plurality of spaced brackets 7 are secured to the rear portion of the frame member 1, as by welding or in any other desired manner. These brackets provide a support for a guide rail 8, to which is secured in sliding relation a head 9 carrying a laterally extending arm 10, braced by any suitable diagonally extending reinforcing means 11, said arm projecting at least partially across said supporting bars or rails 4, and operative to propel the container 5, as it rests and is guided along upon said bar or rail supports.

Said arm-supporting head 9 is secured to a rod, which extends into and is forced to and fro by air, steam, or other form of fluid pressure within a cylinder 13, though it is to be understood that said propelling head 9 and its arm 10 may instead be activated by any other suitable mechanical means, if preferred. In the embodiment illustrated, fluid pressure is admitted and released alternately to and from the opposite ends of said cylinder by means of tubes 14 and 15, which lead thereto from a valve 16, actuated by a manually shifted lever 17 (or automatically, if preferred), and into which valve fluid pressure is conducted by a pipe 18 from any available source.

A relatively fixed knife 19 having a trailing, diagonally extending, cutting edge 20 is supported in any suitable manner, but is here shown as being reciprocatably mounted in a diagonally extending slot 21 in a support 22, and secured in adjusted position by screws or bolts 23. Said knife support is carried by the upper portion of a yoke or frame member 24, which is secured at its opposite ends, as by welding at 25 and 26, to a cross member 27 that is in turn secured to and between the oppositely positioned side members 1. In this or equivalent manner, the knife is positioned so that its cutting edge extends into the path of the cylindrical container 5, resting upon the parallel guide rails or bars 4, as shown in the drawings.

While the container may be filled with any solid or substantially solid material into which a knife blade can extend, as and after it cuts through the wall of such container, it is here shown as being filled with solid frozen sweet cream fat such as is used in the manufacture of commercial ice cream. Such container comprises a cylindrical paper board body portion 28, a lid 29 and a bottom 30. The body portion and bottom are initially secured together in any suitable manner, at least sufficient to maintain them in unitary relationship until the container is filled, after which the lid is placed and secured in position and the contents frozen stiff and solid, and at a temperature that in the case of sweet cream fats is preferably in the neighborhood of 20° F. In this condition the container and contents are stored and shipped, and are sufficiently frozen together that no other fastening means is required.

Finally, in such condition the container is placed horizontally upon the supports 4 and propelled by the arm 10 into the path of the knife edge 20, which first cuts longitudinally through the container lid 29, then through the side wall of the body portion 28 to form a slit or linear severance 31, and then through the edge portion of the bottom 30. It is then possible to lift one edge of the severed container and unroll the body portion of the container from its solid contents, while the lid and bottom are freely pealed away from said contents to which they have been frozen, and the solid cylindrical body of contents lifted and/or rolled or otherwise transported to any position desired, as for example into a cutting or grinding machine. The opposite positions of the container 5 are indicated by the dot-and-dash lines 5' and 6', the latter being its position before encountering the knife, while the former is its position after fully completing its passage beneath and in engagement with said knife, and from which position it can be lifted at will.

Having thus described my invention, what I claim and desire to protect by Letters Patent of the United States is:

1. A container opening machine comprising a rectangular frame, in combination with a pair of combined supporting and guiding rails for a container to be opened, said rails being parallel and longitudinally disposed on said frame and secured thereto, a bar, said bar spanning said frame intermediate the ends thereof and extending transversely thereof, said bar having its ends secured to said frame, an upright yoke extending over said rails, the ends of said yoke being secured to said bar, said yoke and said rails defining a path for a container to be slitted along one of its longitudinal sides, a knife secured to said yoke extending into said path at an angle to said frame, and a propelling mechanism to propel the container along its path, said mechanism comprising a head secured to a reciprocating rod, said head having a flat portion located at substantially a right angle to said rails in the path between said knife and said rails.

2. The construction set forth in claim 1, in which said frame is provided with a longitudinal guiding means along and adjacent one side of said frame and secured thereto, and guiding means on the rear portion of said head cooperating with said guiding means on said frame.

3. The construction set forth in claim 1, in further combination with a cylinder having a piston therein, said cylinder being supported on said yoke by suitable means connected thereto and to said cylinder, said piston being connected directly to said reciprocating rod.

JOSEPH B. ORRELL.

REFERENCES CITED

The following references are of record in the file of this patent:

UNITED STATES PATENTS

| Number | Name | Date |
|---|---|---|
| 248,151 | Elward | Oct. 11, 1881 |
| 1,325,983 | Frogh | Dec. 23, 1919 |
| 1,469,398 | Street | Oct. 2, 1923 |